United States Patent [19]

Lokhoff et al.

[11] Patent Number: 5,060,219
[45] Date of Patent: Oct. 22, 1991

[54] RECORDING SYSTEM FOR RECORDING ONLY THOSE TYPES OF INFORMATION WHICH ARE SPECIFIED BY THE RECORD CARRIER

[75] Inventors: Gerardus C. P. Lokhoff; Rudolf Roth; Wilhelmus P. M. Raaymakers, all of Eindhoven, Netherlands

[73] Assignee: U.S. Philips Corporation, New York, N.Y.

[21] Appl. No.: 287,941

[22] Filed: Dec. 20, 1988

[30] Foreign Application Priority Data

May 18, 1988 [NL] Netherlands .......................... 8801275

[51] Int. Cl.$^5$ .............................................. G11B 7/28
[52] U.S. Cl. ........................................ 369/48; 360/60
[58] Field of Search .................. 369/47, 48, 54, 286.6; 360/50, 27

[56] References Cited

U.S. PATENT DOCUMENTS

| | | | |
|---|---|---|---|
| 4,439,830 | 3/1984 | Chueh | 364/286.6 |
| 4,621,321 | 11/1986 | Boebert et al. | 364/286.6 |
| 4,769,802 | 9/1988 | Tatsduguchi | 369/47 |
| 4,775,901 | 10/1988 | Nakano | 360/60 |
| 4,841,378 | 6/1989 | Cogert | 369/47 |
| 4,879,704 | 11/1989 | Takagi et al. | 369/48 |
| 4,891,504 | 1/1990 | Gupta | 369/47 |

FOREIGN PATENT DOCUMENTS 2104701 3/1983 United Kingdom .

OTHER PUBLICATIONS

Yamaguchi, English Abstract for Japan 59-94242, May 30, 1984.
Minechika, English Abstract for Japan 61-242974, Oct. 30, 1986.
Mishimori, English Abstract for Japan 60-237679, Nov. 26, 1985.

Primary Examiner—Donald McElheny, Jr.
Attorney, Agent, or Firm—Leroy Eason

[57] ABSTRACT

A recording system includes a record carrier of an inscribable type and a recording apparatus. The record carrier is preconditioned with a control information pattern which includes identification of one or more types of information for which recording is permitted on such record carrier. The recording apparatus includes means for determining the type of information received for recording, means for reading the control information represented by the control information pattern on the record carrier, and control means for inhibiting recording if the received information is not of a type identified by the control information read from the record carrier.

12 Claims, 5 Drawing Sheets

RECORDING SYSTEM FOR RECORDING ONLY THOSE TYPES OF INFORMATION WHICH ARE SPECIFIED BY THE RECORD CARRIER

BACKGROUND OF THE INVENTION

1. Field of the Invention

The invention relates to an information recording system comprising a record carrier of an inscribable type and a recording apparatus comprising write means for recording information received by such apparatus on the record carrier. The invention further relates to a record carrier and recording apparatus for use in the system.

2. Description of the Related Art

Record carriers on which digitised audio information is recorded have been available for a considerable time now. Such a record carrier may be for example, an optically readable disc, such as the "Compact Disc" or a magnetic tape, such as the "DAT" cassette tape. The advantage of digitised audio information is the extremely high fidelity.

Another property of digitised information is that it can be copied almost endlessly without any significant loss of fidelity.

This last-mentioned property constitutes a substantial problem in marketing consumer equipment with which digital audio information cannot only be played back but can also be recorded, since such apparatus enables the consumer to evade copyrights on a large scale by simply copying the content of a record carrier with digitised audio information. Since copying does not entail a loss of quality there are hardly any reasons for the consumer to purchase a comparatively expensive original which is subject to copyright if the original, or a copy thereof, is available for copying. This leads to a substantial loss of copyright income.

SUMMARY OF THE INVENTION

It is an object of the invention to provide an information recording system as described above, which prohibits the large-scale evasion of copyrights.

According to the invention this object is achieved by means of a recording system wherein the record carrier is preconditioned with a control-information pattern indicating for which type(s) of information such record carrier is intended the recording apparatus comprises means for reading control information represented by the control-information pattern, test means detecting the type of information received applied, and control means for controlling the recording process in such a way that the received information is recorded only if it is detected to be of a type indicated by the control information being read from the record carrier.

The system in accordance with the invention enables received information to be recorded on a record carrier only if the information is of a type for which this is allowed. This enables a use-dependent charge to be imposed on the record carrier. For example, a record carrier which is intended for recording of computer data may be exempted from charges, while a record carrier on which both computer data and digitised audio information may be recorded is subject to an additional charge in order to compensate for the loss of copyrights when digitised audio information is copied. Such charge would be paid, for example, when the record carrier is purchased.

It is also possible to impose a limited charge on record carriers on which it is allowed to record in digital form audio information which is supplied in analog form.

Thus, the record carriers can be classified in, for example, three categories, namely:
record carriers on which it is only allowed to record computer data,
record carriers on which computer data and audio information received in analog form may be recorded,
record carriers on which computer data, audio information received in analog form, and audio information received in digital form may be recorded.

It will be evident that the above is just one of the many possibilities of dividing the record carriers into categories. In principle, any division into categories is possible if the permissible types of information for the various record carriers can be distinguished from one another.

Another advantage of the system in accordance with the invention is that a large number of different types of information can be recorded/read with the same recording/reproducing apparatus, because the record carriers for the different types of information do not basically differ. All this enables a versatile information-reproducing and/or recording system to be realized, a charge being levied only if information which is subject to copyright is to be recorded.

An attractive embodiment of the recording system is characterized in that the recording apparatus comprises at least two input stages for receiving the information to be recorded, and in that the test means are adapted to detect the type of received information on the basis of the type of input stage which is used. This embodiment utilizes the fact that different types of information require different input stages, so that the type of information received can be determined simply from the input stage which is used.

A further embodiment of the recording system is characterized in that the recording apparatus comprises at least two input stages for receiving information of two different types, selection means for selecting one of the input stages, and means adapted to determine the type of received information on the basis of the selected input stage. This embodiment advantageously utilizes the fact that in a system comprising different input stages the type of information received can be derived simply from the selected input stage.

An embodiment of the system is characterized in that the record carrier is of an erasable type, but the preconditioning control-information pattern is non erasable. Because the control information cannot be erased it is then virtually impossible to alter the record carrier utilization.

If a record carrier with a preformed or prerecorded servo track is used it is advantageous to record the control-information pattern in such servo track. In that case the control information can be read by means of the apparatus already available for reading the information in the servo track.

The control-information pattern can be accommodated in a servo-track portion which is not intended for recording. However, in a very attractive embodiment of the system the control-information pattern is accommodated in the servo-track portion intended for recording. This enables the control information to be tested continually during recording.

The invention is applicable to all kinds of inscribable record carriers. An embodiment suitable for recordings on optical or magneto-optical record carriers is characterized in that the recording apparatus comprises an optical scanning device for scanning the servo track with a radiation beam for the purpose of recording, the read means comprising a radiation-sensitive detector for detecting the radiation beam which is modulated by the track modulation during scanning.

A further embodiment of the system is characterized in that control information represented by the track modulation comprises a position information signal which indicates the position of the relevant track portion relative to the beginning of the servo track, the recording apparatus comprises conversion means for converting the received information, prior to recording into a signal complying with the CD-standard, the control means is adapted to add subcode information to the information to be recorded depending on the position-information being read, and the control means is further adapted to supply the subcode information exclusively if the detected type of information received for recording corresponds to one of the types indicated by the control information being read.

Information cannot be recorded if the addition of subcodes is inhibited. If the addition of subcodes is inhibited, then even though it is possible to record a pattern of information symbols on the record carrier the recorded pattern cannot be read because the subcode information is necessary for controlling the process of reading information recorded in conformity with the CD format. Consequently, said pattern may be regarded as not having been recorded.

Obviously it is possible to combine the inhibition of adding the subcode information with other methods of inhibiting recording, such as for example disabling the input stage and/or the write-signal generation. However, deriving the subcode information from the position-information signal being read is complex and is generally effected by programmable control means, so that in practice it is very difficult to render this kind of protection inoperative by technical adaptations, which renders the system highly tamper-proof.

A further embodiment of the system is characterized in that the control information represented by the track modulation comprises position information signals and synchronization signals, which synchronization signals can be distinguished from the position information signals, the type of synchronization signal indicating the permissible type(s) of information for the relevant record carrier. This embodiment enables the types of information which may be recorded to be indicated without the position-information signals being affected thereby.

A further embodiment is characterized in that the control information represented by the track modulation comprises synchronization signals which can be distinguished from the position-information signals, the type of synchronization signal indicating the permissible type(s) of information for the relevant record carrier. This embodiment advantageously utilizes the fact that there are several types of synchromization signal patterns which deviate from a "biphase" modulation pattern.

BRIEF DESCRIPTION OF THE DRAWINGS

Further embodiments and the advantages thereof will now be described in detail, by way of example, with reference to FIGS. 1 to 12, in which.

DESCRIPTION OF THE PREFERRED EMBODIMENTS

Figure 1:
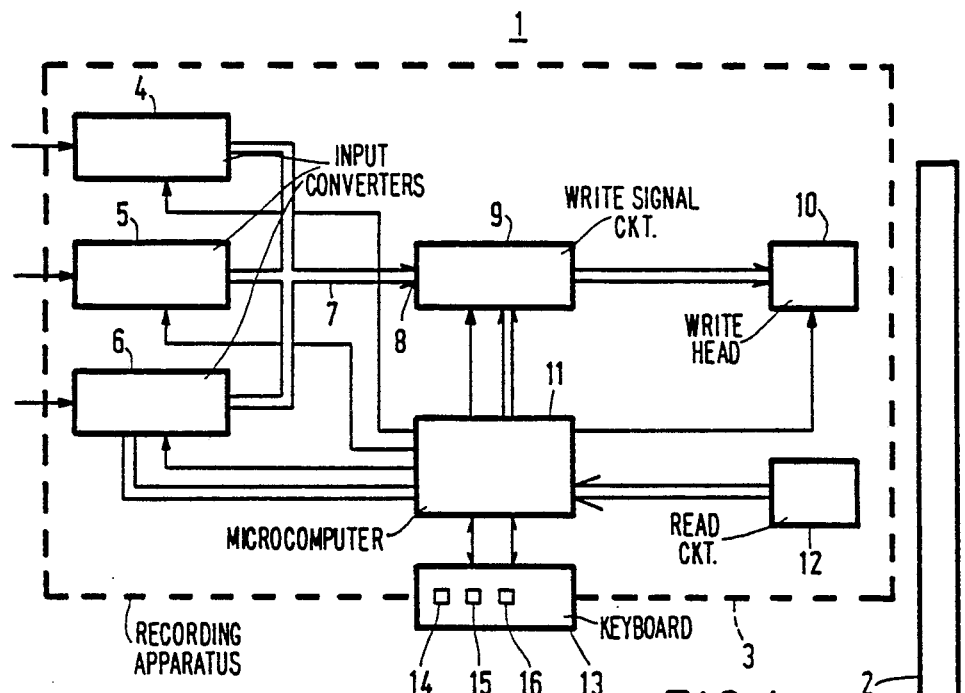
FIGS. 1 and 8 show embodiments of the recording system in accordance with the invention.

FIG. 1 shows dragrammatically an embodiment of a recording system 1 in accordance with the invention. The recording system comprises a record carrier 2 of an inscribable type, for example a magnetic tape or an inscribable optical record carrier in the form of a magneto-optical disc. The recording system further comprises a recording apparatus 3 for recording information which can be received at any of three different input converter stages 4, 5 and 6. The input converter stage 4 may comprise, for example, an analog-to digital converter for sampling an analog signal, for example an audio signal, and converting the samples into n-bit information words. The n-bit information words can be applied to an input 8 of a processing write signal circuit 9 via a bus 7, for example an I²S bus. The circuit 9 write signal generates right signals for a write head 10 derived from the received digital signal, by means of which write head a pattern of detectable marks is recorded on the record carrier 2, which pattern represents the sequence of n-bit information words applied to the input 8.

The input converter stage 5 may convert a standard digitised audio signal, for example an audio signal in conformity with the standard CD "digital audio interface format", into a sequence of n-bit information words each representing an, audio sample. The n-bit information words obtained by means of the input converter stage 5 are also applied to the input 8 of the write signal circuit 9 via the bus 7. This input converter stage 5 may comprise, for example, an integrated circuit which is marketed by Sony, under the type number CX 23053.

The input converter stage 6 may comprise, for example, a circuit which converts a sequence of information words, for example computer data, into a format suitable for storage, for example the standard CD-ROM format. Such a circuit arranges the applied information words in n-bit data blocks, to which additional information words in the form of synchronization words, a header, and additional information words for error correction are added. The sequence of n-bit information words obtained by means of the input converter stage 6 can be applied to the input 8 of the write signal circuit 9 via the bus 7.

For controlling the recording process the recording apparatus 3 comprises a control circuit, for example a microcomputer 11 of a customary type loaded with a suitable control program. The microcomputer 11 comprises a plurality of control outputs which are coupled to the input stages 4, 5 and 6, to the write signal circuit 9 and to the read/write head 10. The microcomputer 11 further comprises a keyboard 13 with three keys 14, 15, 16 by means of which one of the input stages can be selected. The microcomputer 11 is further coupled to a read circuit 12 for reading the control information, which has been prerecorded on the record carrier 2 as a control information pattern and which indicates for which type of information to be recorded the relevant record carrier is intended. For example, the control information may indicate that the record-carrier is intended for recording computer data, or is intended for recording computer data and/or information received in analog form, or is intended for recording computer data information received in analog form, and analog information received in digital form, for example digitised audio information.

The microcomputer 11 is loaded with a suitable program to detect which input converter stage has been selected by means of the keys 14, 15 and 16 and to ascertain whether the type of information for which the selected input stage is intended corresponds to the type indicated by the control information being read from the record carrier. In the case of correspondence, the selected input converter stage and the write signal circuit 9 are activated and the write head 10 is set to the write mode, after which recording can be started. In the case of non-correspondence, recording is inhibited because the circuit 9 and/or the selected stage and/or the write head are not activated, and so the recording process is not started.

Figure 2:
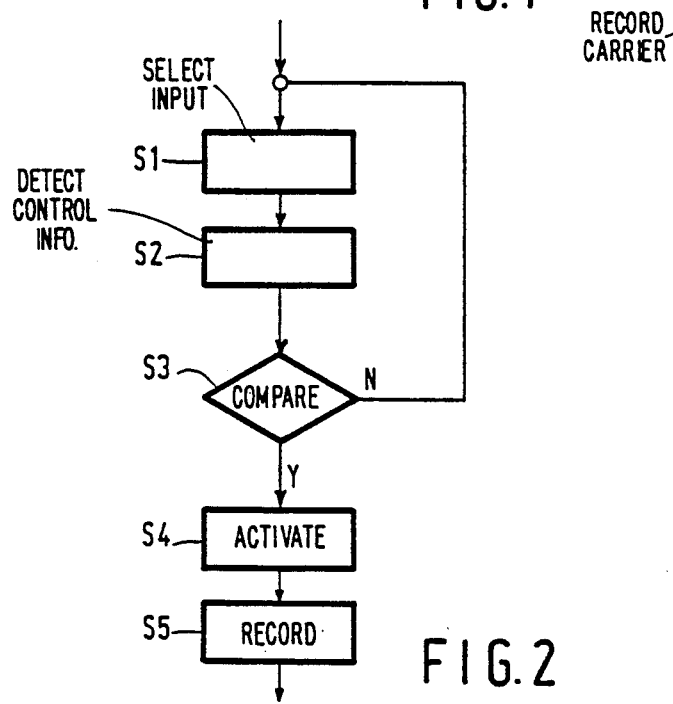
FIGS. 2 and 10 are flow charts of programs performed by a microcomputer incorporated in the recording system.

A flow chart of such a program with which these operations can be performed is given in FIG. 2. In step S1 of the program the input stage selection entered via the keyboard 13 is detected. In step S2 the control information read from the record carrier by means of the read circuit 12 is detected. In step S3 it is ascertained whether the detected control information corresponds to the selected input stage. If this is the case, step S3 is followed by step S4, in which the selected input stage, the processing circuit 9 and the write head 10 are activated, after which recording is started in step S5. However, if during step S3 the control information being read and the selected input stage are found not to correspond to each other S3 is followed by step S1.

In this way recording of information of a type for which the record carrier 2 is not intended is inhibited.

Thus, the above system in accordance with the invention enables a use-dependent charge to be imposed on record carriers. For example, a record carrier on which it is allowed to record audio information presented in digital form may be subject to a charge in order to compensate for the loss of copyrights incurred when, for example, a Compact Disc or a DAT cassette with digitised audio information is copied.

A record carrier which is intended exclusively for the recording of computer data may be exempted from the charge. A record carrier for which the recording of information received in analog form is allowed but for which the recording of higher quality digitised audio information is not allowed may be subject to a smaller charge than a record carrier on which it is allowed to record the higher quality digitised audio information.

The above system comprises three different input converter stages, but it will be evident that the invention is equally applicable to systems comprising only one input converter stage for recording only one type of information.

In the foregoing the type of information to be recorded is detected on the basis of the selected input converter stage. However, it is alternatively possible to detect the type of information from the information which is actually received. However, because of the simplicity with which the type of information can be detected on the basis of the selected input converter stage this method is to be preferred.

Figure 3A:
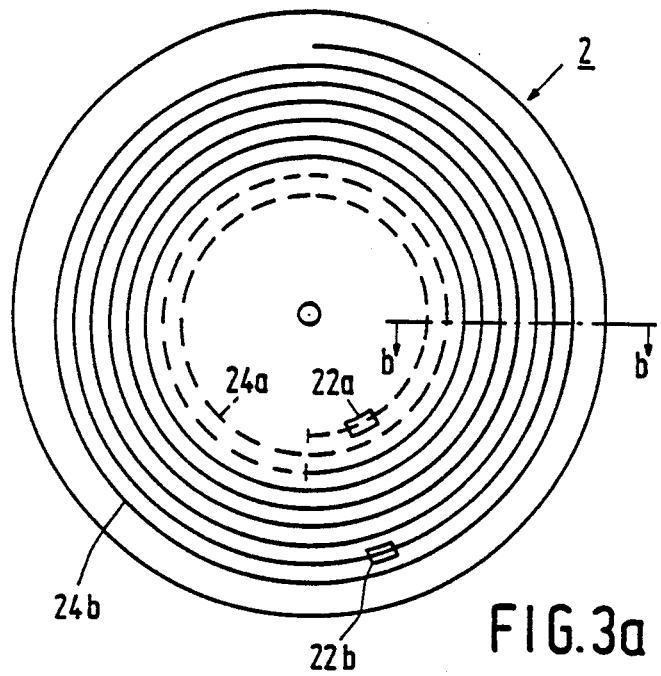
FIG. 3a, 3b, 3c, 3d and 3e are different views of a record carrier for use in the recording system in accordance with the invention.
Figure 3B:
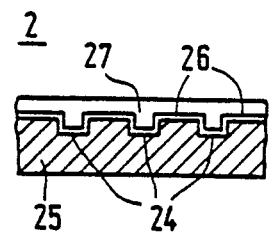
Figure 3C:
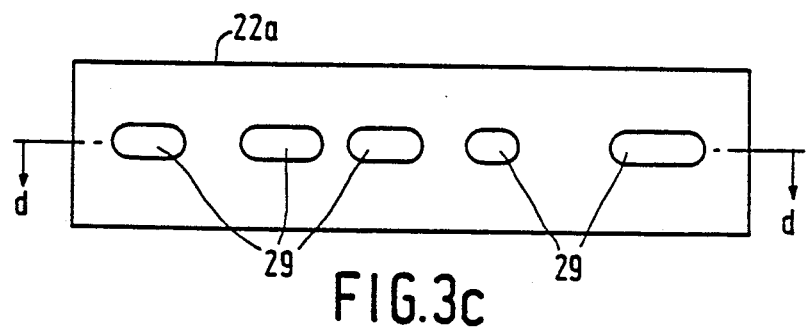
Figure 3D:
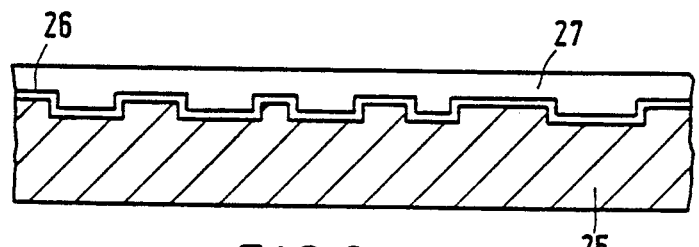
Figure 3E:
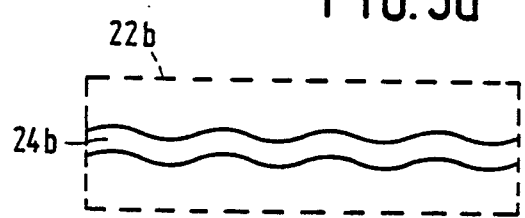

FIGS. 3(a)–3(e) show an example of a disc-shaped record carrier 2 of an inscribable type for use in the system in accordance with the invention. FIG. 3a is a plan view of the record carrier 2. FIG. 3b shows a small part of the record carrier 2 in a sectional view taken on the line b—b. FIGS. 3c and 3e show the portions 22a and 22b of the record carrier 2 to a highly enlarged scale. FIG. 3d shows the part 22a in a sectional view taken on the line d—d.

The record carrier 2 has a servo track, for example in the form of a preformed groove or ridge. The servo track comprises a lead in track 24a provided with a preconditioning information structure comprising a pattern of pits 29 (see FIG. 3c). The servo track further comprises a portion 24b intended for information recording. For the purpose of recording the record carrier 2 is provided with a radiation sensitive recording layer 26, for example a magneto-optical layer, which is deposited on a transparent substrate 25 and which is covered with a protective coating 27. The layer 26 may also consist of a radiation-sensitive material other than a magneto-optical material, for example a material which when heated by means of radiation is subjected to a structural change from an amorphous structure to a crystalline structure or vice versa.

The servo track enables a radiation beam which is focused on the record carrier 1 for the purpose of recording the information to be positioned accurately on the servo track, in other words the position of the radiation beam in a radial direction is controlled, via a servo system which utilizes the radiation reflected from the record carrier 1. The measurement system for measuring the radial position of the radiation spot on the record carrier may correspond to one of the systems as described in the book "Principles of optical disc systems"; Adam Hilger; Bristol and London.

To determine the position of the track portion being scanned relative to the beginning of the servo track a position-information signal is recorded in the form of a preformed track modulation, for example in the form of a sinusoidal undulation of the track as shown in FIG. 3e.

An attractive form of track modulation is that in which the frequency of the track undulation is modulated in conformity with the position information signal.

Figure 4A:
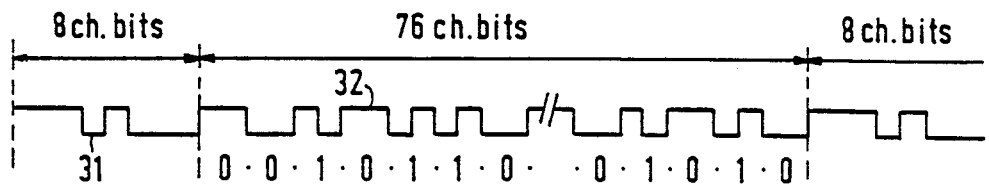
FIG. 4a shows a position-information signal which has been prerecorded as a track modulation in a portion of the servo track of the record carrier which is intended for recording.

FIG. 4a shows an example of a suitable position-information signal comprising position-code signals 32 which alternate with position-synchronization signals 31. Each position-code signal 32 may comprise a "bi-phase-mark" modulated signal having a length of 76 channel bits and representing a position-information code of 38 code bits. In the case of a "biphase-mark" modulated signal, each code bit is represented by two successive channel bits. A code bit of a first logic value, in the present example "0", is represented by two bits of the same logic value. The other logic value ("1") is represented by two channel bits of different logic value. Moreover, the logic value of the "biphase-mark" modulated signal changes after every pair of channel bits, so that the maximum number of successive bits of the same logic value is two at the most. The position synchronization signals 31 are selected in such a way that they can be distinguished from the position code signals 32. This is achieved by selecting the maximum number of successive bits of the same logic value in the position-synchronization signals 31 to be three.

Figure 4B:
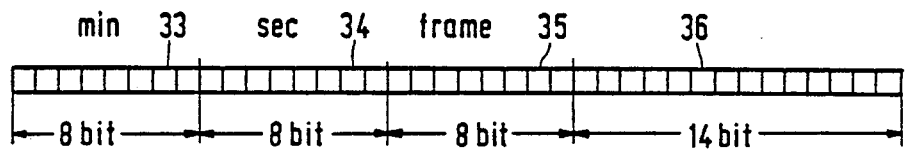
FIG. 4b illustrates the format of the information represented by the position-information signal.

As already stated, the position-information signal represents a position information code having a length of 38 code bits. The 38-bit position-information code may comprise a time code which indicates the time needed to cover the distance from the beginning of the track to the position where the position information signal is situated at the nominal scanning velocity. Such a position information code may comprise, for example, a plurality of successive bytes, for example as used in recording EFM modulated information on CD audio and CD-ROM discs. FIG. 4b shows a position-information code similar to the absolute time code used in CD audio and CD-ROM and comprising a first portion 33 indicating the time in minutes, a second portion 34 indicating the time in seconds, a third portion 35 indicating a subcode frame number, and a fourth portion 36 comprising a plurality of parity bits for the purpose of error detection. Such a position-information code indicating the position in the servo track 24 is attractive if an EFM signal modulated in conformity with the CD audio or CD-ROM standard is to be recorded. In that case the absolute time codes present in the subcode—Q channel are of the same type as the position information code represented by the track modulation.

Figure 5:
FIGS. 5, 6a, 6b, 6c and 7 illustrate different methods of recording the control information indicating the record-carrier designation.

In the case of record carriers intended for recording EFM signals the control information indicating the type of information for which the record carrier is intended can be provided simply in the table of contents (TOC) which is recorded in the lead-in track 24a. For recording this control information one of the subcode channels may be used, suitably the Q channel. This Q channel comprises 98 bits recorded together with the other information in each EFM subcode frame. FIG. 5 illustrates the format of these 98 Q channel bits.

a 2-bit "S0/S1" group
a 4-bit "CONTROL" group
a 4-bit "ADR" group
an 8-bit "TNO" group
an 8-bit "POINT" group
an 8-bit "MIN" group
an 8-bit "SEC" group
an 8-bit "FRAME" group
an 8-bit "ZERO" group
an 8-bit "PMIN" group
an 8-bit "PSEC" group
an 8-bit "PFRAME" group
a 16-bit "CRC" group The "S0/S1" group is used for synchronization. The "CONTROL" group is used for control purposes. By means of a (hexadecimal) code "100" the groups "ADR" and "TNO" in the track portion 24a indicate that the relevant track portion forms part of the lead-in track 24a. The group "POINT" characterizes the type of information stored in the groups "MIN", "SEC", "FRAME", "ZERO", "PMIN", "PSEC", and "PFRAME". The group "CRC" is used for error detection. By means of a unique bit combination, for example "F0" (hexadecimal) it is possible to indicate that the bits in, for example, the group "PMIN" specify the type of information for which the relevant record carrier is intended.

The type of information for which the record carrier 2 is intended can also be indicated by means of the waveform of the disc-synchronization signals 32 in the position information signal.

Figure 6A:
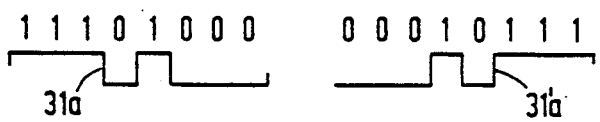
Figure 6B:
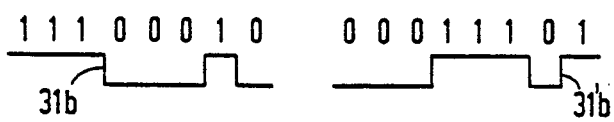
Figure 6C:
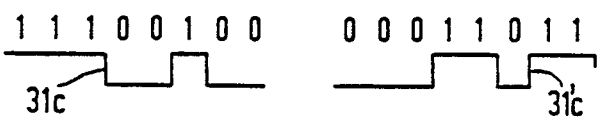

FIGS. 6a, 6b and 6c represent three different position-synchronization signals (and their inverse counterparts), thus enabling three different record carriers to be specified.

Figure 7:
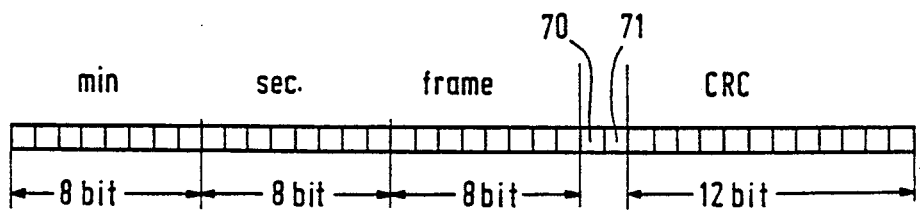

Another possibility is illustrated in FIG. 7, in which the number of bits used for error detection is reduced from 14 to 12, the two bits 70 and 71 which then become available being used for specifying the type of information. It will be evident that two or more of said methods may be combined to specify the type of information.

Figure 8:
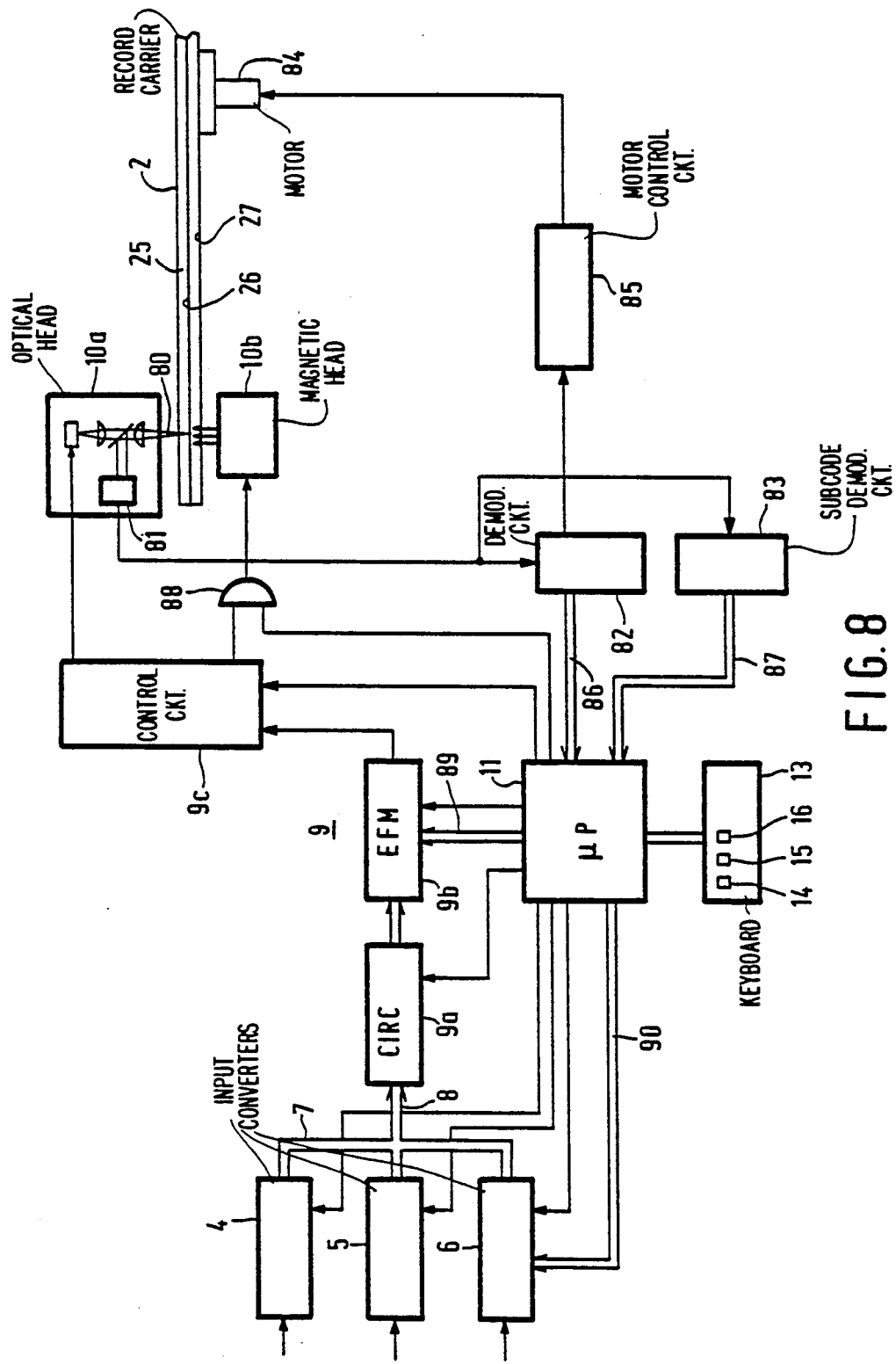

FIG. 8 shows another embodiment of a recording system in accordance with the invention, employing the same disc-shaped record carrier 2 described above.

In the system shown in FIG. 8 elements corresponding to the elements shown in FIG. 1 bear the same reference numerals. The write head comprises an optical section 10a which generates a radiation beam 80 which is focused to form a tiny scanning spot on the recording layer 26 in order to heat the magneto-optical recording layer 26 to approximately the Curie temperature. The write head 10 further comprises a magnetic section 10b comprising a coil for generating a magnetic field which is oriented perpendicularly to the recording layer 26 and which is modulated in conformity with the information to be recorded, in order to produce a pattern of magnetic domains corresponding to the information in this record carrier 26. The write signal circuit 9 comprises three cascaded sections 9a, 9b, 9c. The section 9a comprises a standard "CIRC" circuit for re-arranging the bits of the bit sequence supplied to the input 8 in conformity with the CD standard. The section 9b comprises a standard "EFM" modulation circuit for modulating the information supplied by the section 9a, subcode information supplied via a bus 89 being added to the re-arranged bit sequence obtained from the "CIRC" circuit 9a. The section 9c comprises a control circuit for controlling the write head 10a, 10b. The write signal circuit 9 and the write head 10a, 10b are described comprehensively in published Netherlands Patent Applications NL 8702451 and NL 8703071, herewith incorporated by reference. The optical section 10a of the write head comprises a radiation sensitive detector 81 for detecting the radiation beam 80 reflected from the recording layer 26. The reflected radiation beam is modulated by the track modulation, so that the radiation sensitive detector generates an electric signal modulated in conformity with the track modulation. This electric signal is applied to a demodulation circuit 82, which derives the position-code signals 32 and the synchronization signals 31 from the electric signal. A signal which indicates that a synchronization signal 31 has been detected is applied to a motor control circuit 85 to control a drive motor 84 for rotating the record carrier 2. Controlling is effected in such a way that a constant phase relationship is maintained between the subcode synchronization signals generated by the EFM modulator and the synchronization signals defected by the detector. The demodulation circuit 82 and the control circuit 85 are described comprehensively in published Netherlands Patent Application NL 8800152, which corresponds to U.S. Pat. No. 4,999,825, issued Mar. 12, 1991, herewith also incorporated by reference. The position-code signals 32, which are recovered by the demodulation circuit 82, are applied to the microcomputer 11 via a bus 86. These position-code signals 32 (see FIG. 4a) indicate the position of the servo track 24 being scanned by the radiation beam by means of an absolute time code which corresponds to the absolute time code to be recorded, together with the other information, in the Q channel of the EFM modulated signal. The microcomputer 11 is loaded with a program which ensures that the absolute time codes represented by the position-code signals 32 are applied to the EFM modulation circuit 9b. The manner in which this is effected is described in detail in the aforementioned Patent Netherlands Application NL 8800152 and corresponding U.S. Pat. No. 4,999,825.

The output signal of the radiation-sensitive detector 81 is applied not only to the demodulation circuit 82 but also to a subcode demodulator 83 of a customary type to recover the subcode information recorded, for example, in the lead in track 24a.

Figure 9:
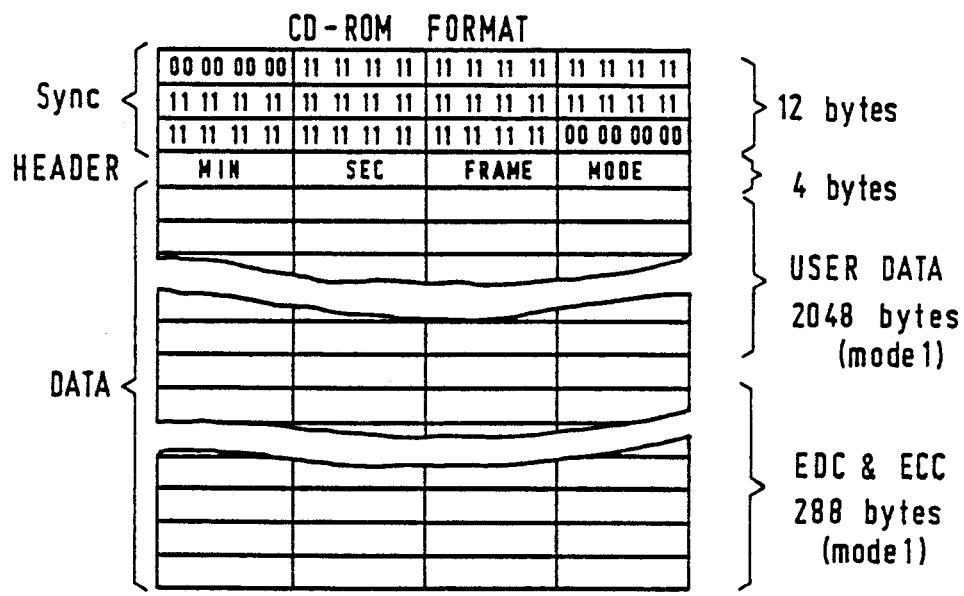
FIG. 9 illustrates the standard CD-ROM format.

The subcode information recovered by means of the subcode demodulation circuit 83 is applied to the microcomputer 11 via a bus 87. Further, a bus 90 connects the microcomputer 11 to the input converter stage 6 to supply the absolute time code included in the header of the CD-ROM data blocks. FIG. 9 by way of illustration gives the format of a CD-ROM data block. The CD-ROM data block is divided into bytes of 8 bits each. The first 12 bytes of the block comprise 12 synchronization bytes. These are followed by 4 bytes, of which the first three bytes represent the address of the block in the form of the absolute time code, the last byte (MODE) indicating how the user data (USER-DATA) are arranged within the block. For MODE 1 the four address bytes are followed by 2048 bytes of user data (USER-DATA), followed by 288 bytes (EDC & ECC) transmitted for the purpose of error detection and error correction. The input stage 6 arranges the incoming user data in conformity with the prescribed CD-ROM format. Such an input stage 6 may comprise, for example, a programmable circuit of a type customary for processing the incoming user data and absolute time codes.

Figure 10:
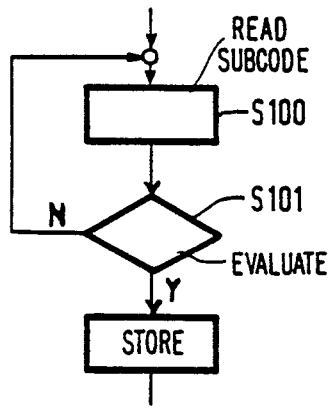

The system shown in FIG. 8 operates as follows. After a new record carrier 2 has been loaded into the recording apparatus the lead-in track 24a is scanned in customary manner by the radiation beam 80, the microcomputer 11 receiving the subcode information derived by means of the subcode demodulator 83. The microcomputer 11 is loaded with a program which selects from the incoming subcode information the control information indicating the type of information for which the relevant record carrier 2 is intended. FIG. 10 gives a flow chart of such a program. In step S100 the subcode frame is read in, after which in step S101 it is evaluated whether the "POINT" group corresponds to "F0" (hexadecimal). If they do not correspond, step 101 is again followed by step S100, in which a subsequent subcode frame is read in. If they do correspond the content of the "PMIN" group is stored in the microcomputer memory. As soon as a write instruction is given, it is ascertained whether the selected input converter stage is allowed for the stored "PMIN" group. If this is not allowed, the write instruction is not started. If it is allowed, the write instruction is carried out, the microcomputer 11 setting the intensity of the write beam 80 to the desired high write level. Moreover, the control signal for the magnetic section 10b of the write head is applied thereto via a gate 88 which is controlled by the microcomputer, and the detected input converter stage, the "CIRC" circuit 9a, and the EFM modulator 96 are activated. Moreover, the microcomputer 11 applies the absolute time code derived from the track modulation to the EFM modulator 9b. If recording is not started the said operations are not carried out, so that information recording is not possible. As already described, the type of information for which the record carrier 2 is intended can also be indicated by means of the waveform of the synchronizing signals 31, as is shown in FIG. 6.

Figure 11:
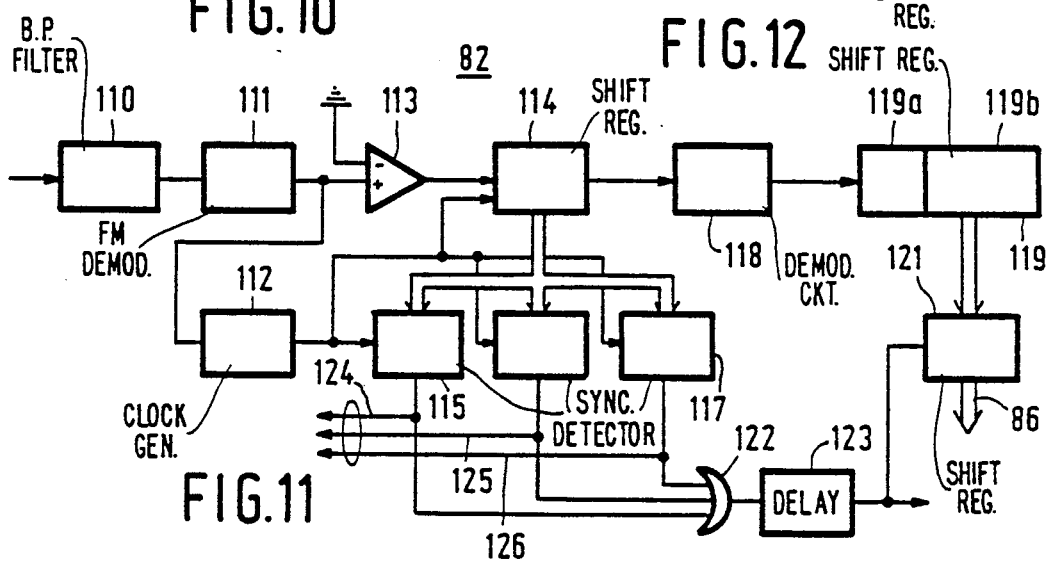
FIG. 11 shows an example of a demodulation circuit used in the system.

FIG. 11 shows an example of the demodulation circuit 82 which detects the various synchronization signals. The demodulation circuit 82 comprises a band-pass filter 110 which transmits those signal components in the output signal of the radiation-sensitive detector 81 which are produced by the FM track modulation.

The demodulation circuit 82 further comprises an FM demodulator 111, which recovers the position-information signal from the output signal of the filter 110. A channel clock regeneration circuit 112 regenerates the channel clock from the recovered position-information signal. The position information signal is further applied to a comparator circuit 113, which converts the position-information signal into a binary signal, which is applied to an 8-bit shift register 114, which is controlled by the channel clock. The parallel outputs of the shift register 83 are fed to synchronization-signal detectors 115, 116 and 117 to detect whether the bit pattern in the shift register corresponds to the position synchronization signals shown in FIGS. 6a, 6b and 6c respectively. The serial output of the shift register 114 is connected to a "biphase-mark" demodulator 118 for recovering the code bits of the position-information code represented by the "biphase-mark" modulated position-code signal. The recovered code bits are applied to a shift register 119 which has a length corresponding to the number of bits (38) of the position-code signal and which is clocked at half the channel-clock frequency.

The shift register 119 comprises a first section 119a having a length of 14 bits, followed by a second section 119b having a length of 24 bits.

The parallel outputs of the second register section 119b are applied to a parallel in parallel out register 121.

The position-information code is recovered as follows: as soon as one of the synchronization-signal detectors 115, 116 and 117 detects that a bit pattern corresponding to a position-synchronization signal is present in the shift register 114, a detection pulse is generated and applied to a pulse-delay circuit 123 via an OR gate 122. The circuit 123 delays the detection pulse by a specific time corresponding to the processing time of the "biphase-mark" modulator, so that at the instant at which the detection pulse appears on the output of the delay circuit 123 the entire absolute time code is present in the second section 119 of the shift register 119. The delayed detection pulse on the output of the circuit 123 is also applied to the load input of the register 121, so that the 24 bits representing the position information code are loaded into the register 121 in response to the delayed detection pulse. The position information code loaded into the register 121 becomes available on the outputs of the register 121, which are coupled to the microcomputer 11 via the bus 86. The outputs of the synchronization-signal detectors 115, 116 and 117 can be connected to inputs of the microcomputer 11 via signal lines 124, 125 and 126, so that the microcomputer 11 can detect from the signals on the signal line 124, 125 and 126 for which type of information the record carrier is intended.

Figure 12:
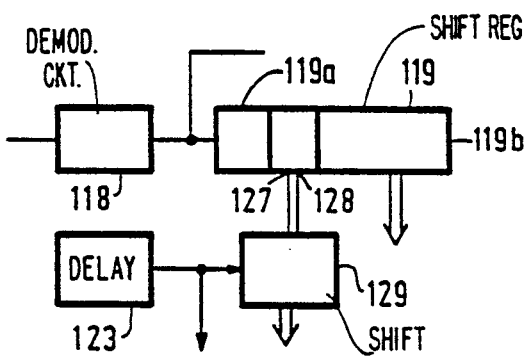
FIG. 12 shows an example of a demodulation circuit used in the recording system.

The demodulator circuit shown in FIG. 11 can be adapted very simply in such a way that the indication of the type of information as shown in FIG. 7 can be detected by means of the bits 70 and 71 in the position-code signals. For this purpose the outputs 127 and 128 of the shift register 119, which indicate the logic values of the bits 70 and 71, must be connected to a two-bit parallel-in parallel-out register 129 (see FIG. 12) via the delay circuit 123. The output signals of the register 129 may again be applied to the computer 11 in order to determine the type of information which may be recorded on the record carrier 2. These two last-mentioned methods of indicating the permissible type of information, the information being derived from the track modulation of the portion 24b of the servo track 24 intended for recording, have the advantage that this information is always available, regardless of the position of the write head 10 relative to the record carrier.

All three embodiments in which the control information about the permissible type of information is recorded in the servo track 24 (lead in track 24a or the portion 24b) have the advantage that for the detection of this type of information they employ almost exclusively components already present in the recording apparatus for other purposes. Further, it is to be noted that in principle the record carrier may be provided with the control information in numerous other ways, so long as appropriate detection equipment for detecting this information is provided. Moreover the term "record carrier" as used herein is to be taken more broadly, to include also a housing, for example a cassette, which during recording is loaded into the recording apparatus together with the carrier of the recording material. Indeed, in accordance with the invention it is also possible to provide the control information on the housing instead of on the carrier of the recording material.

Moreover, it is to be noted that the various methods of providing control information to indicate the type of information to be recorded can be used separately or in combination. However, it is advantageous to store the control information about the permissible type of information in a number of different ways, for example in the lead-in track and also in the servo track portion intended for recording. Such a multiple storage of the control information renders the system even more violation-proof.

What is claimed is:

1. An information recording system comprising a record carrier and apparatus for recording thereon information received by such apparatus for recording; said record carrier having a servo-track wherein the received information may be recorded and a pattern of control information pre-recorded in said servo track which includes identification of one or more types of information which are permitted to be recorded on said record carrier, said pattern being in the form of a modulation of said servo track;

said recording apparatus comprising:

input means for receiving the information to be recorded and identifying the type of such information;

recording means including a recording head for scanning said servo track, said recording means being adapted to record the received information in the servo track and including means for reading the servo track modulation to derive said control information therefrom during scanning of the servo track;

detecting means for deriving from the control information produced by said read means the control information identifying the types of information permitted to be recorded; and control means coupled to said input means and to said detecting means, said control means being responsive to the identifying control information from said detection means to control said recording means so that recording of the received information is only performed if the received information is of a type which is identified by the identifying control information.

2. A system as claimed in claim 1, wherein said input means comprises: a plurality of input signal converter stages to which the received information to be recorded may be selectively applied; and means for identifying the type of received information on the basis of the converter stage to which the received information is applied.

3. A system as claimed in claim 1, wherein said control information pattern includes identification of the plurality of types of information which are permitted to be recorded on said record carrier, and said input means comprises: a plurality of input signal converter stages to which the received information to be recorded may be selectively applied; selection means for selecting any of said input converter stages; and means for identifying the type of received information on the basis of to which of said converter stages the received information is applied.

4. A system as claimed in claim 1, wherein said record carrier is erasable and said pre-recorded pattern of control information is non-erasable.

5. A system as claimed in claim 1, wherein the track modulation representing the control information pattern is included in one or more portions of the servo-track other than portions thereof where the received information is to be recorded.

6. A system as claimed in claim 1, wherein the track modulation representing the control information pattern is included in one or more portions of the servo-track wherein received information is also to be recorded.

7. A system as claimed in claim 5 or 6, wherein said recording head comprised an optical scanning device for scanning the servo-track with a radiation beam, and said read means includes a radiation-sensitive detector for detecting modulated radiation produced by the track modulation during scanning of the track.

8. A system as claimed in claim 5 or 6, wherein: said record carrier is a compact disc (CD) on which the received information can be optically recorded; the control information represented by the track modulation comprises a position information signal which indicates the positions of the relevant track portions relative to the beginning of the servo track; said input means is adapted to convert the received information into a digital signal for recording on said CD; and said control means is adapted to add subcode information to said digital signal in accordance with said position information signal, but to do so only if the received information is of a type which is identified by the control information.

9. A system as claimed in claim 8, wherein the control information represented by the track modulation further comprises a synchronization signal which can be distinguished from the position-information signal, and the synchronization signal identifies the types of information permitted to be recorded on said record carrier.

10. A system as claimed in claim 9, wherein the position-information signal is biphase-mark modulated and the synchronization signal has a waveform which differs from biphase-mark modulation.

11. A system as claimed in claim 1, wherein said record carrier is a compact disc (CD) and the track modulation is a radial undulation of said track at a frequency which is modulated in conformity with the control information.

12. A system as claimed in claim 1, wherein said record carrier is a compact disc (CD) and the servo track has a lead-in portion in which said pattern of control information is pre-formed; and said control means adds said control information to the subcode-Q channel of a digital signal for recording on said CD.

* * * * *